United States Patent [19]

Asioli

[11] 4,300,658
[45] Nov. 17, 1981

[54] METERING VALVE FOR LUBRICATION AND SYSTEMS USING SAME

[76] Inventor: Zeo Asioli, 54, Via Fosdondo, Correggio (Reggio Emilia), Italy

[21] Appl. No.: 45,856

[22] Filed: Jun. 5, 1979

[30] Foreign Application Priority Data

Jun. 16, 1979 [IT] Italy ............... 40089 A/78

[51] Int. Cl.³ ............................................. F16N 25/02
[52] U.S. Cl. .................................. 184/7 E; 184/7 D
[58] Field of Search ................. 184/7 E, 7 D, 7 CR, 184/7 C, 7 R

[56] References Cited

U.S. PATENT DOCUMENTS

| | | | |
|---|---|---|---|
| 1,903,499 | 4/1933 | Bijur | 184/7 CR |
| 2,285,407 | 6/1942 | Bijur | 184/7 C |
| 2,550,535 | 4/1951 | Davis | 184/7 E |
| 2,627,939 | 2/1953 | Leonard | 184/7 E |
| 3,438,463 | 4/1969 | Gruber | 184/7 E |
| 3,715,013 | 2/1973 | Lyth et al. | 184/7 D |
| 3,809,184 | 5/1974 | Smith et al. | 184/7 D |
| 4,079,866 | 3/1978 | Asioli | 184/7 E X |
| 4,108,278 | 8/1978 | Imada | 184/7 E X |
| 4,194,593 | 3/1980 | Snow et al. | 184/7 D |

*Primary Examiner*—David H. Brown
*Attorney, Agent, or Firm*—Browdy and Neimark

[57] ABSTRACT

A metering valve includes its operative parts and a casing in the shape of a cartridge and has, along all or most of its length a given diameter, an entrance bore and an exit bore, the operative parts being enclosed in the casing. The bottom of the casing is flat at the oil entrance side. The casing may extend at the oil entrance side to form a substantially cylindrical tang of the given diameter with flattened portions opposite one another. A smaller, threaded tang extends from the substantially cylindrical tang, the tangs being bored for entrance of the oil into the valve. The casing, as well as the tangs if present, is so shaped that it can fit into a bore provided in a machine part to be lubricated or a distributer. The distributer is preferably of modular construction, a plurality of the modular pieces being of substantially like construction, each having a deviation bore therein to receive a metering valve and opposite flat surfaces having therein respectively a male and female dovetail element.

9 Claims, 16 Drawing Figures

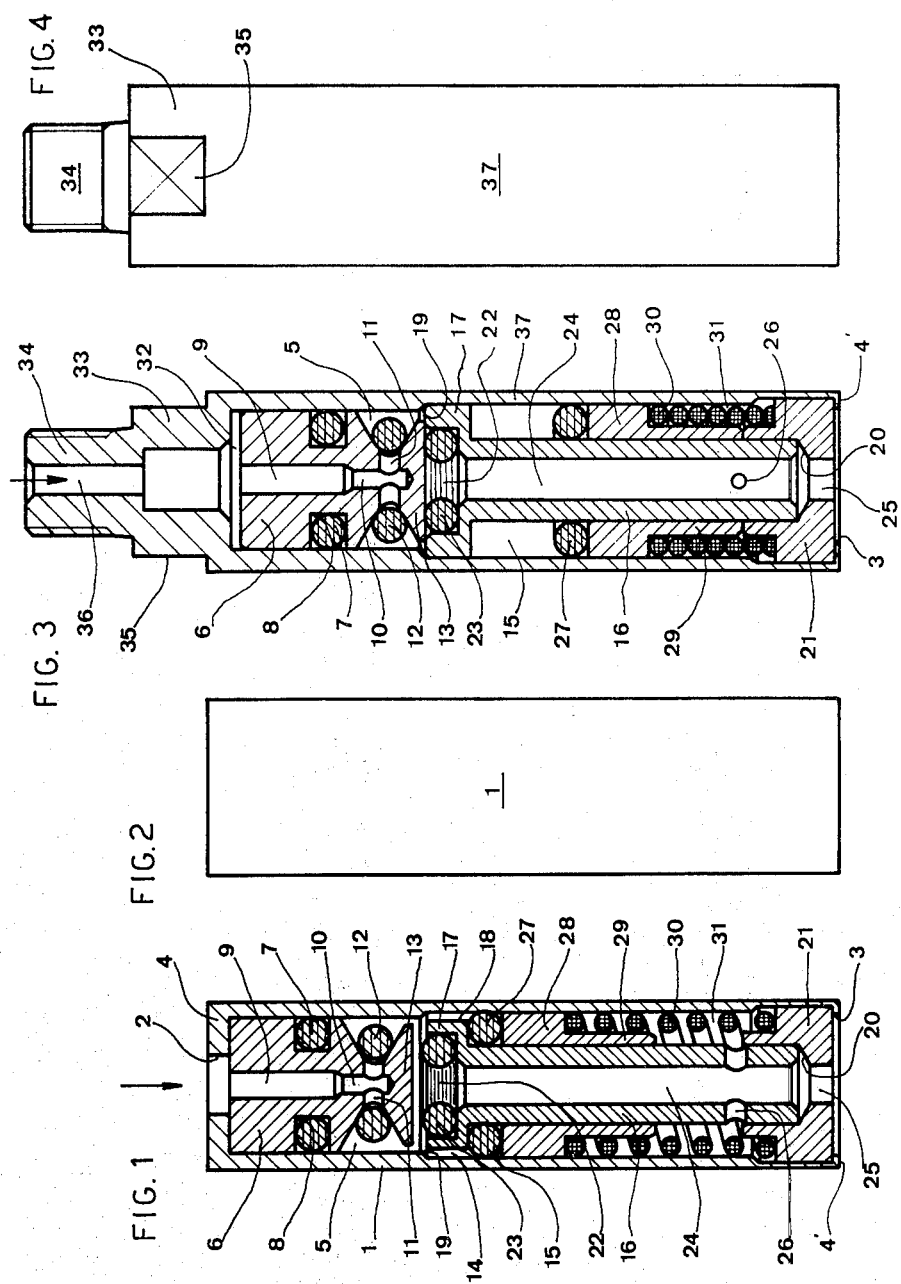

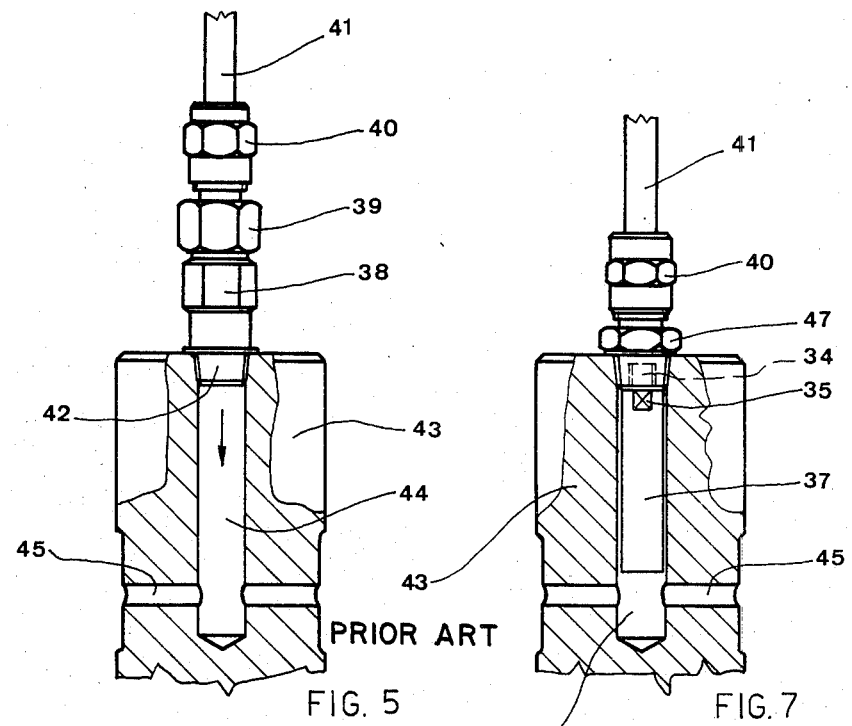
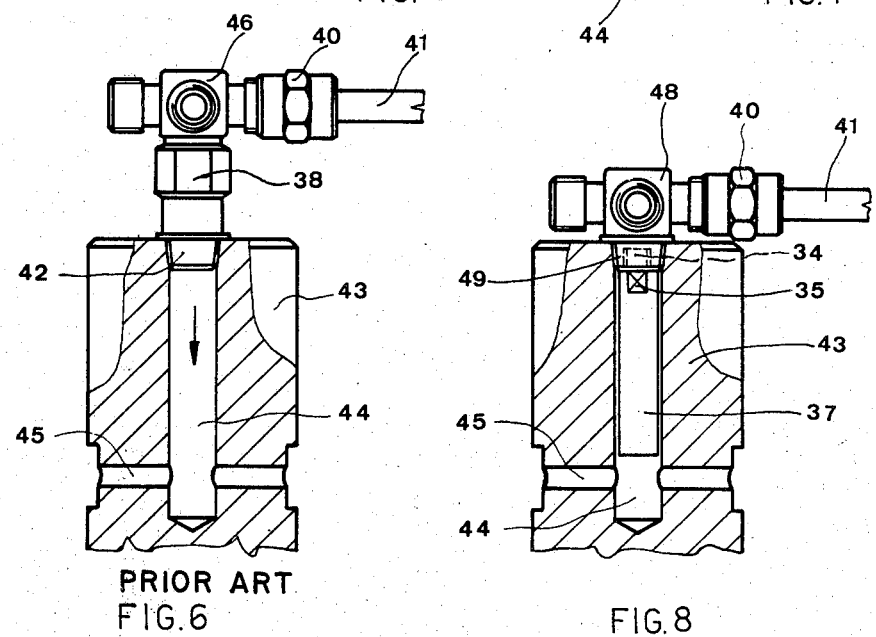

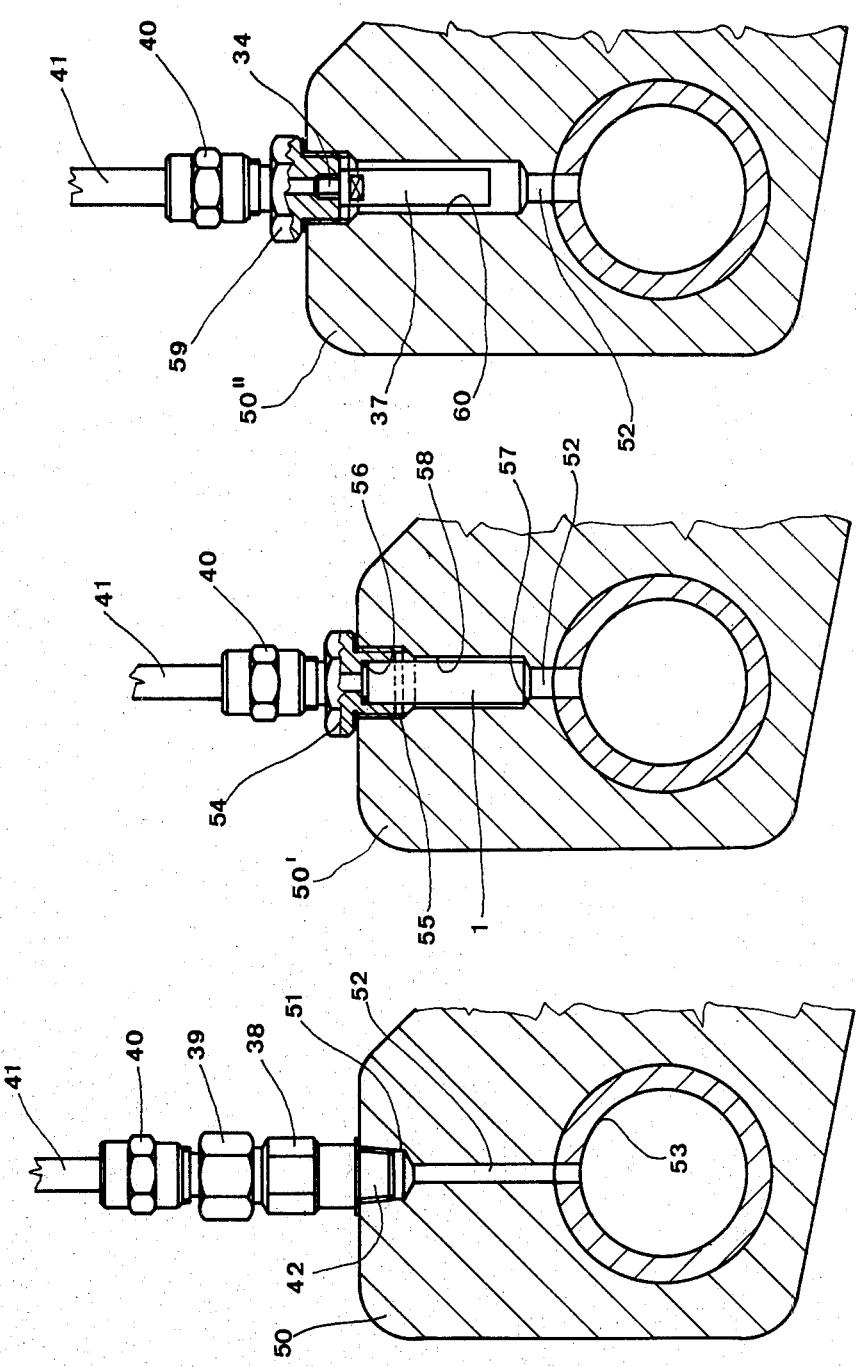

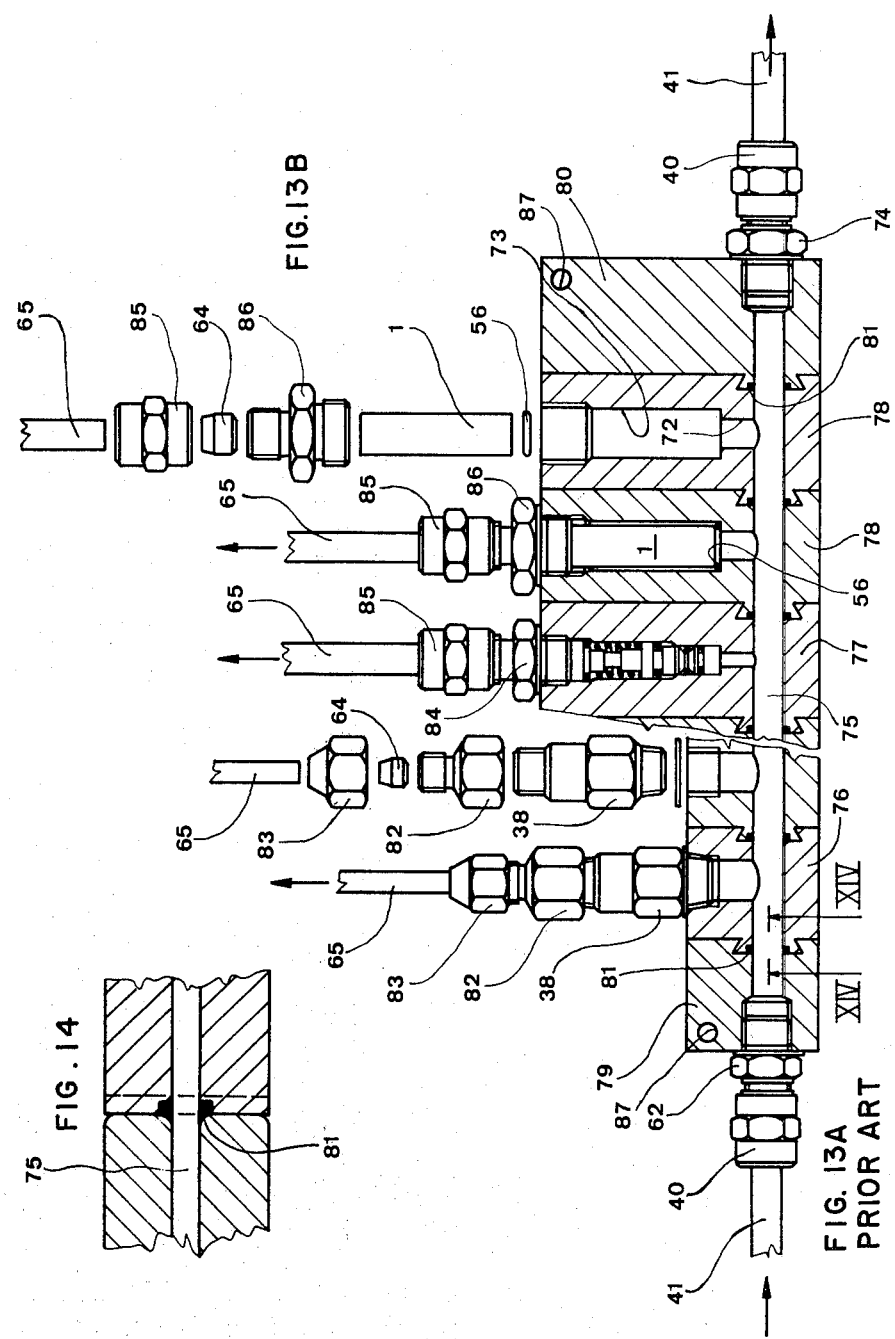

METERING VALVE FOR LUBRICATION AND SYSTEMS USING SAME

BACKGROUND OF THE INVENTION

This invention aims at the improvement of metering valves, lubrication systems using such valves and oleodynamic plants in general, that is to say it deals with a metering valve and advantageous modifications in the members of automatic and semi-automatic cycle lubrication systems for motive machines, machine tools and power consuming machines for industrial and agricultural applications, particularly in case of earth moving machines and crawlers in general, subject to projection of stones and to be used below ground level or for grading. The improvements also have utility in oleodynamic plants and systems in general. The state of art prior to this invention is distinguished by centralized lubrication systems equipped with only a single distribution tube, from which single outputs are branched; each output being equipped with a metering valve at its end of such a type as is disclosed in U.S. Pat. No. 4,016,897 of Zeo Asioli, presenting an outer body formed by a housing with an intermediate prismatic band, for screwing operation and with two threaded end parts, one for the screwing to the delivery fitting or to the distributor body, the other for the direct screwing to the member to be lubricated (pivot, bushing, box and the like) or for the screwing into another pipe-fitting, being part of a distribution tube of the already proportioned oil.

This prior state of art presents some shortcomings and inconveniences because of the fact that such metering valves, the casing of which must necessarily be produced with machine tools, are very expensive and present a considerable weakening in the two threaded areas so that they are frequently subject to breaking due to shocks (facilitated by their excessive projection) or vibrations or projection of stones because of the effect of the action of the wheels of the vehicle. Consequently, in machines like such as excavators for instance the lubrication is still effected by lubricant injection by hand using grease guns in order to avoid the frequent breakage of the metering valves equipped with threads and considerably projecting from the body of the associated machine; this causes a considerable loss of time and damage to the machine, which, in this way, is lubricated in a desultory manner. Moreover, because the distributors for more than one derivation, which have been heretofore constructed as one body only, on which all necessary threadings are made, in case of damage to a single threading only, the whole distributor body has to be discarded, which means a considerable cost and damage. Finally, the possible theorical direct insertion of the metering valve members into a gauged bore of more than one diameter for the coupling in this bore, practically is not feasable because of the high cost of the precision operations necessary to obtain the bore.

SUMMARY OF THE INVENTION

From the abovementioned shortcomings and inconveniences is derived the necessity of resolving the new technical problem of providing new types for casing of metering valves without threadings or with a single threading which is not accessible from the outside, new means of application of the new types of valve casings such as to avoid the projection of the valve from the machine body or to decrease it and/or to protect the whole valve body from the effects of shocks, vibrations and projection of stones and the like. The valve casing and valve according to the present invention is at any rate very economical and such that it is possible to discard the whole valve, when it is worn out. Such valve casings can be inserted into the existing bore for the manual lubrication with grease guns without changing anything, each bore made in the machine or distributor body for the insertion of a valve into it is obtainable without any necessity of precision, which means without any necessity of coupling of its surface with the outer surface of the valve casing. This invention resolves in in an effective way completely the above-mentioned new technical problem by providing a metering valve casing or body with casing shaped like a cartridge without threading and prismatic operation band, economically obtainable without machining with machine tools or with reduced outer machining, to be completely inserted into the small diameter bore of the distributor or of the body to be lubricated, kept in guide at the inside of the bore itself, not precision worked, by the centering of the connection. Moreover, a metering valve body with a casing shaped like a cartridge is foreseen, which is equipped with a bilaterally flattened tang at one end and with threading for the screwing to the inside of a union; it is moreover foreseen to place considerable portions of the male unions at the inside of the machine or distributor body, leaving at the outside only a prismatic operation head and the nut for locking at the tube.

Finally, it is foreseen distributor members made of modular elements which by means of fixed joints can be individually replaced and used in lubrication plants and the like.

BRIEF DESCRIPTION OF THE DRAWINGS

Some realizations of the invention are illustrated in the accompanying five schematic drawing figures.

FIG. 1 is the blown-up longitudinal section of the metering valve with cartridge to be inserted into a cavity;

FIG. 2 is the side view of FIG. 1;

FIG. 3 is the longitudinal section of a metering valve with cartridge and a tang flattened for attachment;

FIG. 4 is the side view of FIG. 3;

FIGS. 5 and 6 represent in partial section the application of the traditional metering valve with hexagonal body and two end threadings to a body to be lubricated, respectively with axially aligned entrance or with derivations for the distribution;

FIG. 7 and 8 represent in partial section the same applications of FIGS. 5 and 6 respectively, moreover, with the use of the valves of FIGS. 3 and 4;

FIG. 9 represents the application of the traditional metering valve to another type of body to be lubricated;

FIG. 10 represents the application to the same body as in FIG. 9 of a valve like the one in FIGS. 1–2;

FIG. 11 represents the application of the valve of FIGS. 3–4 to the same body as in FIG. 9;

FIG. 13 is a partial section of a distributor with modular elements, which make use of different versions of traditional metering valves and also of valves according to the invention; and FIG. 14 is the blown-up section XIV—XIV of FIG. 13 in order to show the union radii of the distribution duct in order to avoid the cutting or the incision of the oil ring.

DESCRIPTION OF THE PREFERRED EMBODIMENTS

Figures 12A, 12B:
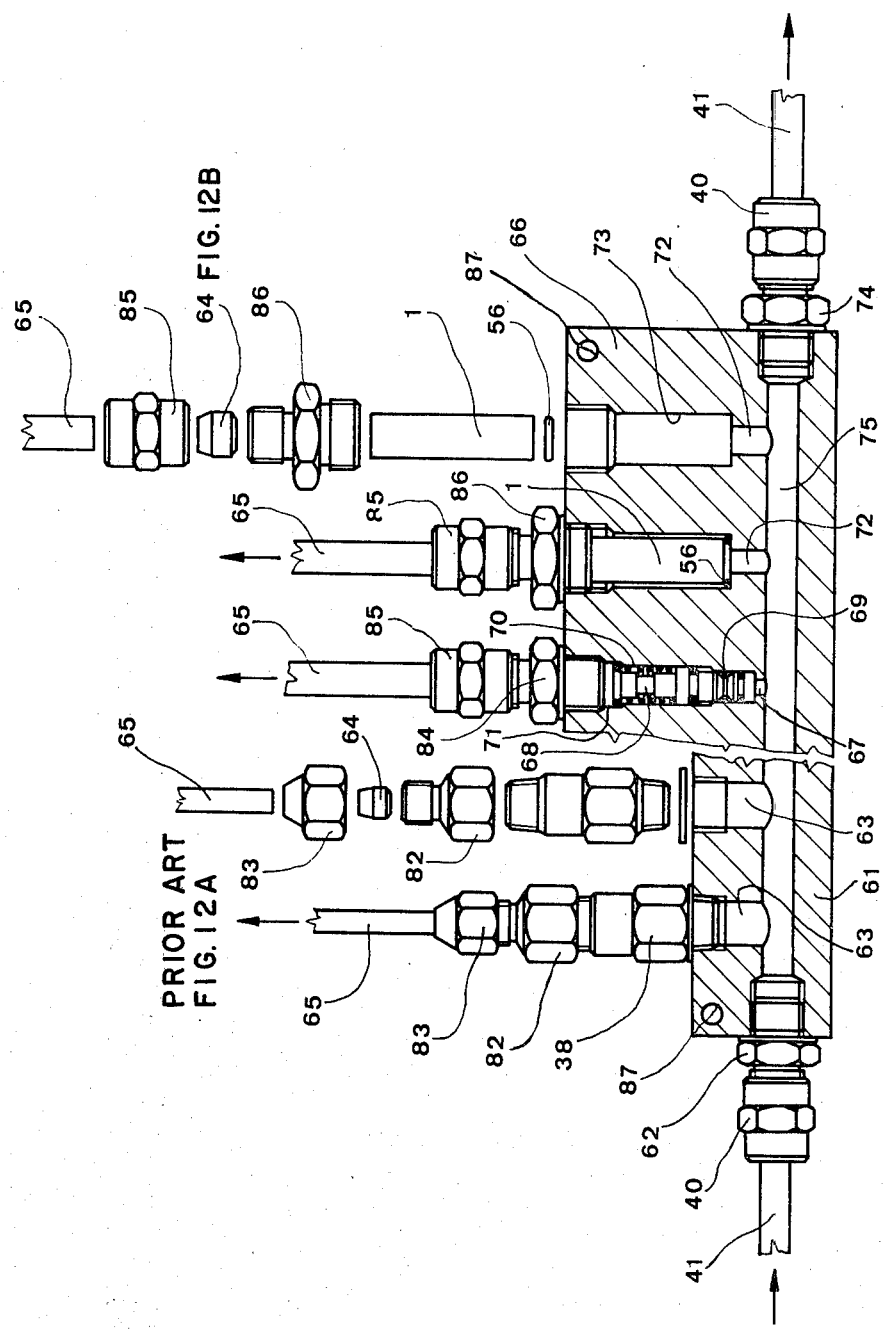
FIGS. 12A and 12B illustrate respectively an assemblage of interrupted sections, demonstrative and comparative of the application of the traditional metering valve and of the metering valves of FIGS. 1–2, respectively, to various types of distributors.

With reference to the figures the indications are as follows:

1 is the body of the valve with cartridge consisting of an outwardly cylindrical container casing with one diameter only, also obtainable with a deep-drawing; 2 and 3 represent respectively the oil entrance and exit bore of the casing 1, respectively determined by the edges of the flat bottom 4 and the edge 4' riveted by the casing 1 itself; and 5 is the lower part of the oil entrance chamber A cylindrical body 6 is coupled, in a gliding way, with the surface of chamber 5; 7 indicates a grommet introduced into a groove 8 of the body 6; 9 is an axial oil entrance bore in the body 6, having a neck 10 to increase the resistance to the passage of the lubricant; and 11 indicates one or more than one radial bores to distribute the lubricant to that part of chamber 5, which remains downhill from the body 6, when the grommet 12, inserted into the circular groove with V-shaped section existing between the body 6 and its appendix 13 with a smaller diameter by means of crimping it to counter-imposed truncated cones, is compelled to widen by the oil pressure in the bores 9,10 and 11. The lubricant flows through the side passages 14 into the upper part 15 of the scavenging chamber equipped with flattenings 18 and, with the upper part, leaning on the narrowing beveling 19, separating the chambers 5 and 15, whereas, with its lower part, it is abutted against a neck 20 obtained in the element 21 seamed by means of bending the lower edge 40'. A chamber 22 is provided in the pad 17 containing a grommet 23, the upper part of which projects from the upper edge of the chamber to act as a sealing against the lower face of the appendix 13. A longitudinal bore 24 of the tubular element 16 has a lower part which extends into the exit bore 25 of the element 21; 26 represents a pair of radial bores of the tubular element 16, communicating with the upper part 15 of the scavenging chamber; and 27 is a grommet inserted between the lower face of the pad 17 and the upper face of the pad 28 of the bushing 29 coupled, in a sliding manner, with the tubular element 16 and with the upper part 15 of the scavenging chamber by the pad 28.

A compressed spring 30 is provided between the upper face of element 21 and the lower face of pad 28; 31 is the lower part of the scavenging chamber; 32 represents (FIGS. 3-4) the upper part of chamber 5; 33 indicates the initial cylindrical part of the casing preceded by a threaded tang 34 of smaller diameter, provided with operation flattenings 35. An oil entrance bore 36 is provided for the threaded tang 34; 37 is the body of the outwardly cylindrical casing with one diameter of the valve with a casing in the shape of a cartridge having a tang 34; 38 (FIG. 5) indicates the body of a traditional metering valve connected to the union 40 by means of nut 39 for the locking of tube 41 for the oil feeding; 42 represents the threaded fixing of body 38 to body 43 to be lubricated, equipped with bore 44 for the feeding of the correct quantity of lubricating oil and with bores 45 for the distribution of the oil to the surfaces to be lubricated; 46 indicates (FIG. 6) a more-than-one-way fitting screwed onto the upper part of body 38 of a traditional metering valve. As shown in FIG. 7, a fitting 47 is screwed into bore 44 of body 43 to be lubricated, at the inside of this body being screwed the threaded tang 34 of casing 37; and 48 (FIG. 8) indicates a more-than-one-way fitting like 46, moreover equipped with a tang 49 inwardly and outwardly threaded respectively for the fixing to the threaded tang 34 of the casing 37 and to the bore 44 of the body to be lubricated 43.

As shown in FIG. 9, a body 50 to be lubricated, for instance cast, is equipped with a threaded bore 51 and with a bore 52 for the feeding of the quantities of oil to the cavity 53; 54 (FIG. 10) indicates a male fitting to be screwed to the bore 55 of body 50', equipped with a cylindrical housing for the insertion of the casing 1 into it; and 56 represents an elastic oil ring, compressed between the bottom of the above said cylindrical housing and the upper bottom 4 of the casing 1, the lower bottom of which 4' is positioned against the lower limit 57 of bore 58.

As seen in FIG. 11, a body 50" is associated with a fitting 59, which is, a fitting like 54, moreover equipped with inside threading for the screwing of tang 34 of the casing 37 into it, the tang being inserted into the bore 60 without touching its bottom; 61 (FIG. 12) is the conventional body of a distributor, to which the male feeding fitting 62 is screwed; 63 represents some bores of body 61 for distribution of the oil to the conventional metering valves 38, inserted in a way, which is not the optimum; and 64 indicates an element with two surfaces of truncated cone shape for the oil-proof sealing of tube 65, which distributes the already proportioned oil. The body 66 of a distributor according to the invention, which is only as an example is equipped with a possible but not convenient solution with a bore 67 to distribute the oil to the metering valve 68, the members of which are directly inserted into a precision bore with three diameters 69-70-71 pre-arranged for the valve itself in the body 66; 72 indicates some bores of body 66 for the distribution of the oil by means of metering valves with a casing of the types shown in FIGS. 1 and 2, seated in bores 73, with a single diameter, of the body itself.

A male fitting 17 of the continuation of the feeding is provided; 75 is a passage bore of the feeding between 62 and 74; 76 indicates (FIG. 13) some distributor elements, which are fitted by a particular dovetail coupling, each element being equipped with a metering valve of conventional type with outward application; 77, 78 indicate some distributor elements, as well fitted together by dovetail coupling for the application of one valve like those of FIG. 12 at the inside of each of them, each of these distribution elements being equipped with feeding bore 75, with bores 72-73 respectively for delivery to the cartridge and for the housing of the latter. One side face of the distributor element is equipped with male dovetail and the opposite one with female dovetail, 79 and 80 are heads of the assembleable distributors for the fitting of unions like 62 and 74 to them; 81 represents rings inserted into a recess of the male face of the dovetail for the oil-proof sealing against the female dovetail; and 82 (FIGS. 12 and 13) represents a fitting at the exit of the metering valve 38. A locking nut 83 is provided for tube 65; 84 is a fitting of the same type as 62; 85 indicates a male fitting of the same type as 40; and 86 is a male fitting like 54. Some bores 87 are provided for the fixing of the distributors 61, 66, 76, 77, 78, 79 and 80 to the case of the machine by means of screws not represented, particularly when there is no sufficient depth for insertion of the valves in the machine body. Practically, the execution details, the dimensions, the materials, the shape of the invention may in any case vary without leaving its juridical dominion, indeed the thus conceived invention is susceptible to modifications and variations, all within the inventive concept. Thus, for instance, the inner organs of the metering valve according to FIGS. 1 and 3 might be different and differently combined among each other. Finally, all the members can be replaced by other technically equivalent elements.

I claim:

1. A metering valve for use in a machine part to be lubricated, a distributor or the like to meter flow of a lubricant, the machine part, distributor or the like having a lubrication bore of given diameter therein, the valve comprising metering means for metering lubricant and including an entrance bore and an exit bore; and an integral casing of cylindrical shape, having a first end, a second end and at least along a substantial portion of its length an outside diameter equal to said given diameter; a first aperture in said first end of said casing and defined thereby in fluid communication with said entrance bore; and a second aperture in said second end of said casing and defined thereby in fluid communication with said exit bore, said casing having portions which extend inwardly at least from said ends to hold said metering means axially in place within said casing.

2. A metering valve according claim 1, wherein said casing is of said given diameter along its entire length.

3. A metering valve according to claim 1, wherein said casing includes two flat surfaces along a portion of its length starting from said first end, said flat surfaces being opposite one another.

4. A metering valve according to claim 1, wherein said casing includes at least one flat surface along a portion of its length starting from said first end.

5. A metering valve according to claim 1 or 4, in operative association with a body defined by a maching part or distributor, said body including a bore having an initial trunk and an intermediate trunk of greater diameter than said outside diameter of said casing and a bottom which terminates on a narrowing shoulder of said bore of said body, said initial trunk of said bore of said body being positioned towards outside of said body and being threaded, a male fitting in threaded engagement with said portion towards the outside, and a fitting of an oil tube coupled to said male fitting, said male fitting being equipped with a cylindrical, inside cavity for centering of an end trunk of said casing in it, and an operation nut adjacent an outer surface of said body.

6. At least one metering valve according to claim 1 or 4, in operative association with a distributor, said distributor comprising a plurality of side-by-side distributor elements, each of said elements having a feeding bore and a derivation bore transversal to it, said at least one metering valve being positioned in one of said derivation bores and so as to be coupled to a respective oil output tube, flat side surfaces of at least some of said elements forming flanks respectively equipped with fixed dovetail means, one with a male dovetail and the other with a female dovetail, each said element being traversed by a longitudinal feeding bore, each said male dovetail being equipped on its face around said longitudinal feeding bore with an oil ring against a respective corresponding female dovetail of that one of said distributor elements to which it is adjacent.

7. A metering valve according to claim 4 or 3, including a threaded tang extending from said first end of said casing, said threaded tang including a bore therein in fluid communication with said first aperture via a further bore which extends axially within said casing substantially along that portion of its length which corresponds with its said flat surface or surfaces.

8. A metering valve according to claim 7, in operative association with a body defined
by a machine part or distributor, said body having a bore with a diameter greater than said outside diameter of said casing and such a length as to exceed axially location of said exit aperture of said casing, an initial trunk of said bore of said body being threaded, a male fitting in union with a tube for feeding oil, said male fitting being inwardly equipped with a threaded bore for screwing into it of said threaded tang of said casing, and an operation nut resting against an outer surface of said body.

9. A distributor for passing lubricant to a plurality of lines via metering valves, said distributor comprising a plurality of side-by-side distributor elements each of said elements having a feeding bore and a derivational bore transversal to it, flat side surfaces of said elements forming flanks respectively equipped with fixed dovetail means, one with a male dovetail and the other with a female dovetail, each said element being tranversed by a longitudinal feeding bore, each said male dovetail being equipped on its face around said longitudinal feeding bore with an oil ring against a respective corresponding female dovetail of that one of said distributor elements to which it is adjacent.

* * * * *